April 7, 1959  R. E. FISHER  2,880,912
SYSTEM FOR DISPENSING FLAVORED BEVERAGES
Filed April 18, 1955

INVENTOR.
RUSSEL E. FISHER
BY Norman R. Wissinger
ATTORNEY

[Column 1]

2,880,912
SYSTEM FOR DISPENSING FLAVORED BEVERAGES

Russel E. Fisher, Dayton, Ohio

Application April 18, 1955, Serial No. 502,030

5 Claims. (Cl. 222—129.4)

The present invention relates to a system for preparing and dispensing a large variety of different flavored beverages in individual receptacles requiring a minimum of space and materials inventory. Such a system therefore lends itself to use in drink dispensing or vending machines for use on ships, aircraft, busses or the like where space requirements are limited, but a variety of different flavored beverages are nonetheless desired.

In the past, drink dispensing or vending machines have relied upon bottled beverages wherein the flavored beverage has been placed in quantities for individual consumption in a bottle or carton and the vending or dispensing machine has served to allow the removal of one such bottle or carton at a time. More recently the trend has been toward the use of machines which allow for the mixing of ingredients just prior to consumption of the drink which is usually prepared directly in the vessel from which it is to be consumed. This has represented an improvement over the bottle or individual carton dispensing machines in that the containers for the beverage have no longer represented a handling and storage problem, and the mixed, flavored drink has been found to be desired by many over the typical bottled drink.

As the use of machines for individually mixing a flavored beverage just prior to the consumption thereof has grown, it has been found that such machines could be still more advantageously employed if they were equipped to dispense a variety of different flavored drinks. While there are therefore, on the market today, machines which will provide any one of from three to six different beverages in response to the choice of the consumer at the time of his purchase or removal of the drink from the machine, the addition of any one of these flavors or types of drinks has added seriously to the cost and size of the machine. As a result, those machines which are now capable of dispensing say six types or flavors of drink are so excessively large and expensive that their would-be usefulness is lost for the want of the necessary capital to justify the risk of purchasing and operating such equipment and for the want of sufficient space in the locations where such machines normally may be used.

In the prior art drink mixing and dispensing machines, the basic elements have included a means for establishing a flow of a beverage base, usually water which is heated or refrigerated and often carbonated. At the same time, these machines have included reservoirs of flavored syrup such as lemon, wild cherry or the like which has been mixed with the beverage base at the time of purchase or just prior to the removal of the drink from the machine. In addition to the flavoring and sweetening, this flavored syrup has included certain additives such as citric acid and phosphoric acid to lend a tang to the drink. Since a certain neutralizing action between these additives and the flavoring takes place, it has been the customary practice to incorporate as a preservative a small amount of sodium benzoate.

The normal operation of these machines has involved the positioning of a consumption receptacle in a position to receive the beverage base and the flavored syrup which flows in controlled amounts thereinto. Where a temperature-controlled drink is desired as in the case of a conventional cooled carbonated soft drink, the base and the flavored syrup are passed through refrigerating chambers prior to their entrance into the receptacle. The conventional receptacle is a waxed paper cup capable of holding a six-ounce drink. Into such a vessel approximately five ounces of the water or carbonated water are allowed to flow along with approximately one ounce of the flavored syrup. Since one-sixth of the drink thus mixed is composed of the flavored syrup, it is evident that in order to provide as cool a drink as possible, it is important that this amount of flavored syrup as well as the larger amount of the beverage base should be refrigerated. Where the beverage base is carbonated or has a gas dissolved therein, the importance of the refrigeration of the flavored syrup is enhanced in that unless this syrup is substantially of the same temperature as the carbonated solution, the gas will escape therefrom upon contact with the warmer syrup. This escape of the gas is undesirable not only because of the loss of the desired properties in the finished drink but also because the foaming which results upon the escape of this gas will cause the drink to overflow the intended receptacle and will leave this receptacle, the machine and often the consumer covered with the sticky product.

Thus, where a six-ounce drink is dispensed, a gallon of the flavored syrup will provide approximately 125 drinks. When it is considered that a dispensing machine in a normally productive locality may be called upon to dispense five hundred drinks a day it can be seen that at least a four-gallon reservoir of the flavored syrup would be desirable. On the other hand, notwithstanding the daily demand, the machine will usually be provided with a cup capacity of one-thousand. Thus, in order to render the machine capable of producing as many drinks as it can contain cups, which is desirable for many obvious reasons of economy, it would be necessary to provide an eight-gallon reservoir of the flavored syrup. While this is within the realm of reason for so-called single drink machines; i.e. machines dispensing one type or flavor of mixed drink, the provision of different flavored syrups to guarantee a sufficient syrup supply for even three different flavors of drinks would require a storage capacity of twenty-four gallons for the flavored syrup—eight gallons for each of the available flavors, since it is impossible to anticipate in advance what flavors will be selected by the consumers. If, for example, the three flavors of syrup were stored in capacities only sufficient to total the 1000 cups; i.e. say three gallons each of two flavors and two gallons of the other flavor, it is more than likely that one of these flavor supplies would be exhausted long before the others and, of course, long before the exhaustion of the cup supply and the otherwise full potential of the machine. It is obvious that the provision of such storage capacities of necessity requires an excessively large machine which will take up more room than is usually available for this type of equipment and will also be relatively expensive. At the same time a large inventory of the flavored syrup is required to maintain such a machine in operative condition.

The added expense and size of the multiple drink machines are not the sole result, however, of the necessity for storage capacity, for each of these flavored syrups must be separately maintained in the machine to avoid an undesirable mixing and dilution of the different flavors and to preserve the purity of any given flavor which the customer might choose. Because of this necessity for separate maintenance, it is also necessary that these flavored syrups be separately refrigerated or heated or at least refrigerated or heated by separate coils passing through a heat-exchange chamber. The addition of a coil of sufficient length to provide the necessary refrigeration time during the flow of the syrup for each of the different syrups obviously complicates the refrigeration mechanism and increases its size and expense, as well as that of the overall machine.

It is accordingly an object of the present invention to provide a simple and economical method for preparing a flavored beverage.

It is a further object of the present invention to provide such a method which will allow for the mixing of a large variety of flavored drinks from ingredients stored in a minimum of space.

It is yet a further object of the present invention to provide a system for preparing and dispensing a large variety of flavored beverages which are carbonated and temperature-controlled.

It is still another object of the present invention to provide a method for preparing a variety of cooled beverages capable of utilizing a very simple and economical refrigeration equipment.

Another obejct of the present invention is to provide a method for storing and dispensing mixed drink components which will eliminate the necessity for the use of undesirable food preservatives.

Still another object of the present invention is to provide a preferred form of apparatus for preparing and dispensing a large variety of flavored beverages.

To achieve these and other objects and advantages of the present invention which will be apparent from a reading of the following description, the invention herein involves the recognition of the fact that flavored beverages of the type herein considered are composed of three basic elements; viz., a beverage base, sweetening and flavoring. It is further recognized that many available flavored beverages differ only with regard to the flavoring ingredient and that the determinative quantity of the conventional flavor concentrate is only one-half of a cubic centimeter in the case of the popularly accepted six-ounce drink. The present invention utilizes the nominal determinative proportions of this flavoring ingredient by separating it from the sweetening with which it has in the past been associated in the art of drink mixing. With the separate maintenance of this flavoring it is possible to provide large supplies of the beverage base and the sweetening, which are neutral so far as flavor is concerned and which all drinks regardless of flavor have in common, and to add to unit quantities of these ingredients only a very small amount of the flavoring according to the desired flavor. Thus, in the six-ounce drink referred to above, there will be approximately five ounces of the neutral beverage base, usually water, plain or carbonated, to which are added just less than an ounce of sweetening, usually a concentrated sugar-water solution, and one-half cubic centimeter of the flavoring of the liquid flavor concentrate variety made from the natural oils and juices of the flavor source such as oranges, lemons and the like in the manner well known to the art. While it is possible according to this invention to pre-mix the beverage base and sweetening and then to add the separately maintained flavoring to this mixture at the time the drink is prepared, the separate maintenance of the sweetening would be preferred since this ingredient has to be prepared and stored whereas the beverage base is usually water and may be drawn from any water source such as existing plumbing outlets. This separate maintenance is further preferred in order to provide an additional moving factor in the thorough mixing of the flavoring in the drink.

It can be seen that this method, utilizing the separation of the previously employed flavored syrup into its components of sweetening and flavor concentrate, lends itself in many ways to the preparation and dispensing of flavored beverages in vending machines and similar dispensing apparatuses where space and cost of equipment are important factors. Such separation allows for the procurement of relatively large supplies of beverage base and sweetening along with the establishment of relatively small quantities of the flavored concentrate which is to be employed in relatively infinitesimal quantities in the individual drink. Because of the small supply of flavor concentrate required, it is now possible according to this invention to store many such flavor concentrates in the same space normally occupied by only one or two of the previously employed flavored syrups and thereby to provide a greatly increased number of available flavors. At the same time, because only such a small quantity of the flavor concentrate is required, it has been found according to this invention that only the relatively larger quantities of the beverage base and the sweetening have to be cooled or heated in the case of temperature-controlled beverages, while the flavor concentrate may be stored and mixed in the drink at ambient temperatures, the quantity thereof being so small that its temperature will have little or no effect upon the temperature of the mixed beverage. Since the flavor concentrate does not therefore have to be refrigerated, the addition of a large variety of flavors in a given machine does not require a similar increase in the number of freezing coils or other complications of the refrigerating equipment. And so it is that, even where a carbonated drink is desired, the ambient temperature of the flavor concentrate will have no undesirable effect upon the tendency of the carbon dioxide or other gas to remain dissolved in the beverage base. It has been further found that where the flavor concentrate is stored and maintained separately and apart from the sweetening until the time of its mixture in the final drink just prior to its consumption, there is no longer any need for the use of preservatives such as the sodium benzoate, which in addition to having an astringent taste undesirable in foods of any kind, is also dangerous to life and health when taken in concentrations larger than one-tenth of one percent.

In order to maintain the beverage base, the sweetening and the flavor concentrate in separate supply until the time of mixing and in order to obtain satisfactory mixing at the time the final drink is dispensed, it has been found that when each of the separate ingredients mixes with any of the other ingredients, both the ingredient being mixed and the ingredient with which it is being mixed should be in motion and the mixing should take place at a point removed from the separate reservoirs and channels supplying the separate ingredients and away from the vessel or receptacle in which the final drink is being mixed. In order to provide a still more complete mixing of each ingredient with each of the other ingredients, it has been found to be further desirable that each ingredient; i.e., either the beverage base, the sweetening or the flavor concentrate should contact both of the other ingredients substantially simultaneously and while both of these other ingredients are in motion, once again this contact being effected at a point removed from the apparatus maintaining their distinctness and from the receptacle in which they will finally come to rest as a final flavored beverage. While it is preferred that each ingredient meet the other of the ingredients while all are in motion and substantially simultaneously, it is to be understood that, particularly in view of the large variance in the required amount of each ingredient that their flows do not have to be coextensive. It is sufficient only that the flow of each ingredient be partially simultaneous with that of at least one of the other ingredients; i.e., the flavor concentrate for example may be injected into the stream of the beverage base for only a portion of the time required for the flow of the latter. This same is also true for the sweetening with regard to its mixing with the base and for the flavor concentrate with regard to its mixing with the sweetening. It is still preferred, however, that the ingredient least in point of time and/or quantity of flow should have its entire flow coextensive as well as simultaneous with the flows of the other ingredients. Thus, it develops that the most perfect mixing will take place if the flavor concentrate enters or is poured into the mixing area at the time that both the beverage base and the sweetening are also poured therein. The mixing of these ingredients at a point removed from either the dispensing apparatus or the receptacle insures that none of the ingredients will adhere to any of these elements to prevent their thorough mixing. At the same time, the separation of the individual flavors from the apparatus at the time of their entering into the finished drink will prevent any carry-over of a flavor which may adhere to a part of the machine from one drink of one flavor into the next drink which may be of a different flavor and would be contaminated by the previously employed flavor.

The invention thus generally described may be more clearly understood from the following detailed description of a preferred embodiment of the method and apparatus thereof in connection with which reference may be had to the appended drawings.

Figure 1:
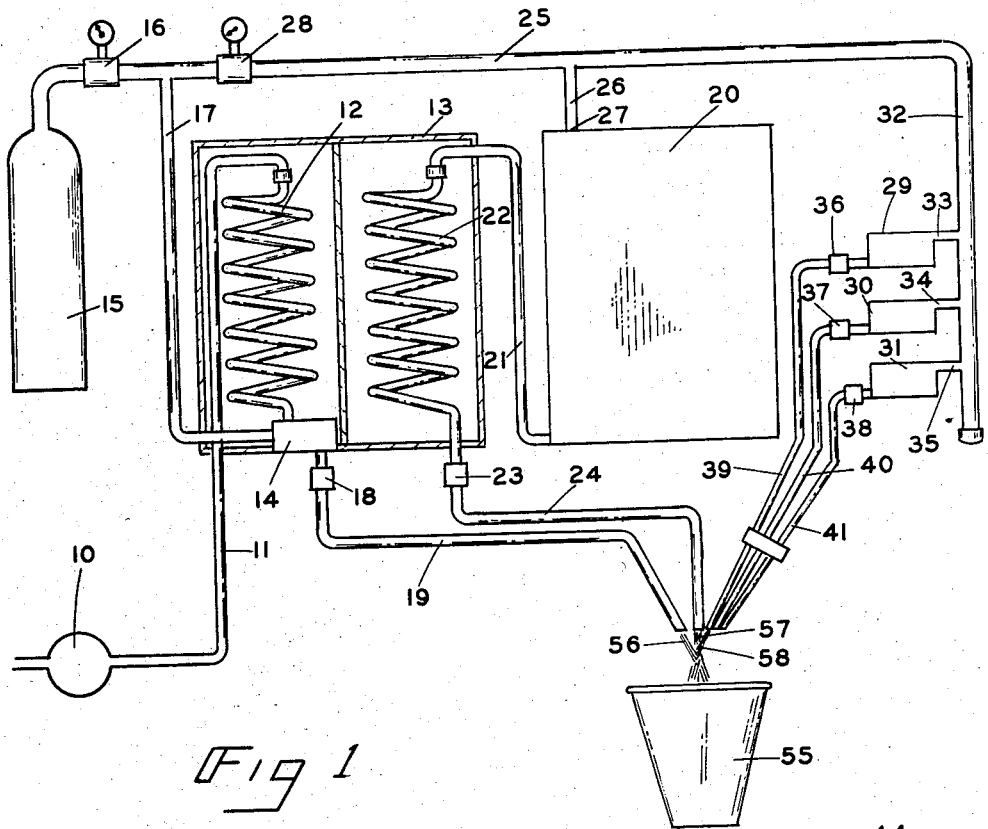
Figure 1 is a schematic illustration of the method and an apparatus for practicing the method of this invention.

In Figure 1 it will be noted that there is first established a supply or flow of water, for example by means of a pump 10 connected to a well or similar water supply which empties into the conduit or passage 11 which passes through the refrigeration or heat exchange coil 12 within the insulated chamber 13. If it is desired to dissolve a gas in the beverage base as in the case of carbonated beverages in which carbon dioxide gas is dissolved in the base, usually water, the precooled water may pass through a conventional carbonating chamber 14 which is merely a gas-filled chamber into which the water is sprayed or otherwise dissipated. It is to be understood that this carbonation chamber 14 may be so located and connected to the coil 12 that the beverage base passing therethrough may go through or by-pass the carbonation mechanism. By controlling the valves regulating the flow of the base through the coil and carbonator it is, of course, possible for one to select whether the particular flavored beverage he chooses will or will not be carbonated. The carbon dioxide gas to supply the carbonation chamber 14 is supplied from the pressure storage container 15 which passes through the regulator valve 16 and the conduit 17. Since the carbon dioxide will better and more quickly dissolve in the beverage base when the gas is under greater pressure, it is preferred that the regulator 16 allow the passage of the gas under something on the order of 60 to 80 p.s.i. of pressure. The pressure made available from the pressurized container 15 may also be utilized as the actuating force for the other ingredients to be employed in the drink as will be hereinafter more fully explained.

The beverage base, usually water, having been cooled travels from the heat exchange coil 12 or indirectly therefrom through the carbonator 14 to the valve 18 and from this valve, when it is open, through the conduit or passage 19 to the receptacle 55 which may be one designed for individual consumption of the drink and in the preferred embodiment shown is a waxed paper cup having say a six-ounce capacity.

The sweetening, usually in the form of sweetened syrup such as a concentrated sugar-water solution known as simple syrup, is stored in the reservoir 20. One preferred form of simple syrup may be made by dissolving 6⅓ pounds of sugar in one gallon of water. Since, as stated above, this sweetening will be used in volume proportions approximating one-sixth of the final drink, it is necessary that the temperature of this material be controlled to match that of the desired end product. Similarly, in view of the proportions of sweetening, it is necessary, where a carbonated beverage is desired, that this material be cooled so that the carbon dioxide which has been dissolved in the beverage base will not escape from such solution to cause undesirable foaming and loss of carbonation in the end product. To accomplish this necessary temperature control, the syrup is led from the reservoir 20 through the conduit or passage 21 to the coil 22 similar to the coil 12 for the beverage base so that the desired heat exchange may take place. In the case of a cooled beverage this heat exchange is, of course, a refrigeration process and the coils 22 and 12 are nothing more than refrigeration coils. Once this sweetening material is cooled, it is allowed to pass through the valve 23 into the passage or conduit 24 and from there into the receptacle 55. While the flow of the sweetening syrup may be actuated by a pump similar to the pump 10 for causing the flow of the beverage base, it is convenient in many cases to utilize the pressure of the pressurized gas receptacle 15 for this purpose as mentioned above. This is accomplished by allowing the gas from the container 15 to be exposed to the syrup reservoir 20 by means of a suitable pipe 25 which is connected to the reservoir by the pipe 26 and the opening 27 and to the pressurized container 15 through the regulator valve 28. Since the high pressures required for carbonating the beverage base are not required to provide the desired flow of the sweetening material, it is possible to employ a lower pressure on the order of 15 p.s.i. through the regulator 28.

The individual flavoring ingredients are stored in the reservoirs 29, 30 and 31, which, because of the relatively small amount of flavoring required, may be appreciably smaller than the reservoir 20 for the sweetening material. Since such a small amount of the flavor concentrate is required it is not necessary that the flow thereof be cooled before entering into the final drink, so it is no longer necessary according to this invention to complicate the refrigeration or temperature control requirements and apparatus by the addition of any number of flavors. As in the case of the sweetening material, the flow of the flavor concentrates may be actuated by pressure from the pressurized container 15 through the pressure line 25, the manifold extension 32 thereof and individual pressure lines 33, 34 and 35 leading to the reservoirs 29, 30 and 31 respectively. With the pressure thus supplied, the flavor may flow through any one of the valves 36, 37 or 38 of the respective reservoirs, through the individual conduits 39, 40 and 41 into the receptacle 55. It is preferred that the individual flavor concentrates be maintained in their own separate conduits and flow establishing means until immediately prior to the entrance of the concentrate into the consumption receptacle in order that one flavor will not remain in a common passage or conduit to contaminate a different flavor if such be chosen for incorporation in a succeeding beverage to be taken from the machine.

The foregoing description has dealt with the storing and supplying of the necessary ingredients to prepare a variety of different flavored beverages including the means for establishing and actuating the separate and distinct flows thereof. In order to properly prepare the finished mixed flavored beverage, it remains to control the flows of the component ingredients from the point of quantity, time and direction. As illustrated in Figure 1, the direction of the various flows of the ingredients is determined by the positioning of the conduits or pipes through which they flow just prior to their entry into the receptacle 55. As previously stated, it is important that each of the component ingredients contacts at least one of the other components while both of the contacting ingredients are in motion. Similarly, it is preferred that the point of contact between these ingredients should be at a place removed from the receptacle and from the conduits or other means for establishing the flow of these ingredients into the receptacle. Consequently, in the preferred embodiment illustrated in the drawings, the conduit 19 for the water or similar beverage base, the conduit 24 for the sweetening material and each of the flavoring conduits 39, 40 and 41 are all directed to substantially the same point which is approximately above the opening of the receptacle. Although the three ingredients are in this preferred method and apparatus directed toward one single point or confluence at which each of the ingredients is to flow at least partially simultaneously with one of the others, it is to be understood that where it is desirable for reasons of design, space requirements or the like, it is possible to prepare a drink according to this invention by allowing any one of the ingredients to mix with another of the ingredients at a point removed from where this other ingredient mixes with a third ingredient, it being only necessary that at the time each of the ingredients contacts any of the other ingredients to mix therewith, both of the contacting ingredients are in motion.

Figure 2:
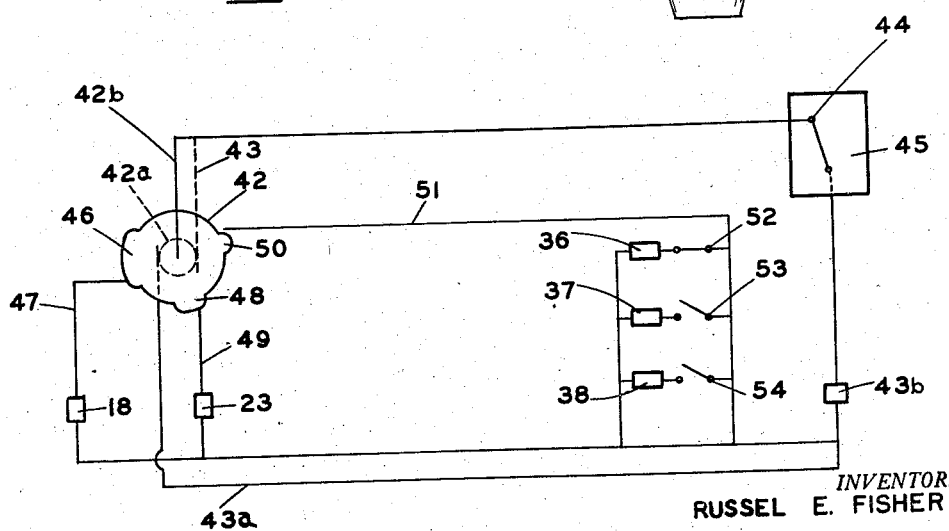
Figure 2 is a basic wiring diagram for actuating the apparatus shown schematically in Figure 1.

In the preferred embodiment of the apparatus of this invention shown in the drawings, the quantity of any of the ingredients which is allowed to flow is a function of the time allowed for such flow and this time is controlled by a timing circuit shown schematically in Figure 2. In this figure, the timing rotor 42 is driven by an electric motor (42a) which is operated from the power circuit 43 and 43a from the power source such as the transformer 43b. This power circuit is closed by the closing of the switch 44 and in drink vending machines this closing of the switch may be done by the passage of a proper coin through a conventional coin changer-switch 45. Upon the closing of the switch 44, the distributor rotor 42 will be electrically charged by the lead 42b and set in rotation to distribute the electricity to the various valves in the flow channels of the respective ingredients. Thus, as the rotor 42 begins to rotate, say in counter-clockwise fashion, the cam 46 will make contact with the lead 47 establishing a circuit to the valve 18 as shown in Figure 1, which in the case of this preferred illustration may be a solenoid valve which will be held open so long as it is energized by current passing through the distributor cam 46. As the rotation of the rotor continues, the cam 48 will contact the lead 49 to energize a similar solenoid for opening the valve 23 in the path of the flow of the cooled sweetening syrup as explained above in connection with Figure 1. Finally, as the rotation of the rotor 42 continues, the smaller cam 50 will contact the lead 51 thereby leading electric current to the parallel circuit in which are the valves 36, 37 and 38 which are in the flow of the individual flavor concentrates and which in this preferred embodiment are solenoid valves. The energization of any one or more of these solenoids 36, 37 or 38 will depend upon the position of the switches 52, 53 and 54 respectively, and the condition of the switches may be made to depend upon the selection by the consumer of the beverage by placing proper selecting buttons or keys on the exterior of the machine so that a choice of which valve to open and consequently what flavored beverage will be dispensed may be made. Mechanical means for so connecting the selective means for closing one of the switches in the parallel circuit are well known and may be such as to prevent any two of the switches from being closed at the same time.

Referring again to the rotor 42 and the cams thereon, it will be noted that in this preferred construction, the cam 46 for operating the solenoid 18 for allowing the flow of the beverage base has a longer outer periphery so that it will maintain a prolonged contact with the energizing circuit for the solenoid 18. Accordingly, the beverage base will not only begin to flow in advance of the rest of the ingredients but also it will flow longer than any of the other ingredients, since the valve 18 which is the only factor limiting this flow will be open for a greater length of time. At the same time, the cam 48 is of a smaller outer periphery so that the solenoid 23 which it operates and which dispenses the sweetening material will be open less time than the beverage base valve. Finally, the cam 50 controlling the flow of the flavor concentrate of which only a very small amount is used in each drink has a limited periphery capable of contact with the lead so that any one of the solenoids 36, 37 or 38 will be open only a very short time. It is to be understood, of course, that the amount of any one of the ingredients flowing may also be varied by enlarging or restricting the size of the openings through which it passes or by changing the pressure behind such flow, so that each of the flows of the individual ingredients may flow for the same length of time and the proper proportions of the individual ingredients may be maintained by varying the flow rates thereof in well-known manners.

In the operation of the preferred apparatus for preparing and dispensing one beverage, upon the closing of the switch 44 say by the insertion of a proper coin into the coin switch box 45, a separate mechanism operated by a circuit closed at the same time may operate a conventional cup-dispensing unit to bring an individual paper cup such as 55 into proper position beneath the spouts for the various drink ingredients to be mixed. Then as the rotor 42 brings the cam 46 into contact with the lead 47, the valve 18 will open allowing the water 56 which has been pressurized by the pump 10 as well as cooled and possibly carbonated to flow into the receptacle 55. Shortly thereafter, the cam 48 contacting the lead 49 will open the valve 23 and allow the flow of the sweetening material 57 along with that of the beverage base such as the water. Finally, the cam 50 will cause the opening of whichever valve in the flavor concentrate circuit has been connected to the circuit by the pre-selection of the proper flavor and the closing of the proper switch. In the illustration, the switch 52 to the valve 36 has been closed so that the flavor concentrate 58 from the reservoir 29 will flow and the drink will have the flavor of that reservoir.

While a preferred apparatus for carrying out the method of this invention has been set forth, it is to be understood that the method of this invention may find utility in a variety of drink mixing and dispensing apparatus, in drink bottling machines and in soda fountain soft drink mixing and may be carried out by manual pouring. No matter in what field the present method is employed, it is apparent that a much larger number, even up to 50 or 60 different flavors will be made available from one dispensing arrangement without the necessity for the storing of large quantities of different materials. In order to blend the separately prepared and maintained ingredients according to this invention, the pouring of these ingredients may be controlled in a variety of ways including manual dexterity to cause the pouring to take place at the proper time and place.

While the invention has been set forth in considerable detail in connection with the above preferred embodiments thereof, it is to be understood that the particularization herein has been for the purpose of illustration only and is in no way to limit the scope of this invention as it is more particularly defined in the subjoined claims.

I claim:

1. In a system for dispensing a plurality of different flavored beverages in which each beverage consists of a neutral base liquid comprising the major portion of a beverage, a neutral sweetening liquid comprising a minor portion of the beverage, and a flavor concentrate liquid comprising a minute portion of the beverage, and in which each ingredient is separated, independently controlled and dispensed for intermixing in a container; a source of pressurized neutral base liquid, a reservoir of neutral sweetening liquid, at least one reservoir of flavor concentrate of relatively small capacity when compared with the reservoir of neutral sweetening liquid, pressure means operatively connected to said reservoirs of sweetening and flavor concentrate liquids for applying pressure to dispense the same, an independent discharge means communicating with each one of said reservoirs and said neutral base liquid, an insulated chamber through which said neutral base and neutral sweetening liquids pass upstream of the discharge means thereof, and operating means operatively connected to said discharge means for permitting measured amounts of the ingredients to be directed to a container for receiving the beverage.

2. The system of claim 1 including carbonation means communicating with said source of neutral base liquid upstream of the discharge means thereof.

3. The system of claim 2 in which said carbonation means comprises the pressure means for said neutral sweetening and flavor concentrate reservoirs.

4. The system of claim 1 in which said discharge means converge at a common point of discharge for intermixing of the beverage ingredients prior to receipt in a container.

5. In a system for dispensing a plurality of different flavored beverages in which each beverage consists of a neutral base liquid comprising the major portion of a beverage, a neutral sweetening liquid comprising a minor portion of the beverage, and a flavor concentrate liquid comprising a minute portion of the beverage, and in which each ingredient is separated, independently controlled and dispensed for intermixing in a container; a source of pressurized neutral base liquid, a reservoir of neutral sweetening liquid, a plurality of reservoirs of different flavor concentrates of relatively small capacity when compared with the reservoir of neutral sweetening liquid, pressure means operatively connected to said reservoirs of sweetening and flavor concentrate liquids for appliyng pressure to dispense the same, an independent discharge means communicating with each one of said reservoirs and said neutral base liquid, an insulated chamber through which said neutral base and neutral sweetening liquids pass upstream of the discharge means thereof, and operating means operatively connected to said discharge means for permitting measured amounts of the ingredients to be directed to a container for receiving the beverage.

References Cited in the file of this patent

UNITED STATES PATENTS

| | | |
|---|---|---|
| 1,681,929 | De Armond et al. | Aug. 28, 1928 |
| 2,071,990 | Tiger | Feb. 23, 1937 |
| 2,205,147 | Madsen | June 18, 1940 |
| 2,227,101 | Meyer | Dec. 31, 1940 |
| 2,462,019 | Bowman | Feb. 15, 1949 |
| 2,572,541 | Thompson et al. | Oct. 23, 1951 |
| 2,627,369 | St. Laurence | Feb. 3, 1953 |
| 2,657,628 | Von Stoeser | Nov. 3, 1953 |
| 2,682,984 | Melikian et al. | July 6, 1954 |

FOREIGN PATENTS

| | | |
|---|---|---|
| 591,859 | Great Britain | Sept. 1, 1947 |